Figure 1:
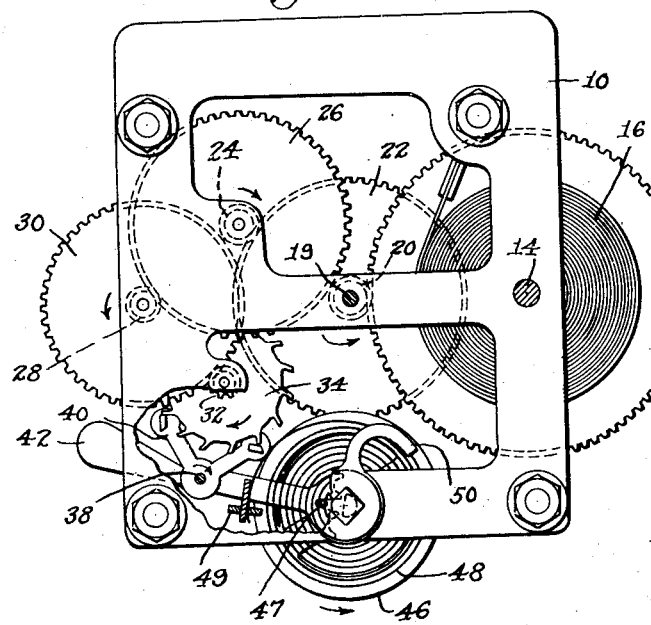

June 11, 1935.   M. KNOBEL   2,004,814

CLOCK MOVEMENT

Filed Aug. 29, 1934

BALANCE WHEEL
PERIOD 1.5 SEC.

Inventor
Max Knobel
by Kenway & Witter
Attorneys

Patented June 11, 1935

2,004,814

UNITED STATES PATENT OFFICE 2,004,814

CLOCK MOVEMENT

Max Knobel, Arlington, Mass.

Application August 29, 1934, Serial No. 741,924

2 Claims. (Cl. 58—7)

This invention relates to clock movements of the type which include intermittent escapement mechanism controlled in its period by a hair spring balance wheel.

Clocks of this type have been made heretofore in enormous quantities and it has been the general custom to employ in them a balance wheel having a period of 100 or more complete beats per minute. The commercial alarm clock is an example of such movements and these have a period of 120 to the minute or one each half second. I have discovered that certain beneficial and unexpected results and improved characteristics are manifested in a clock movement having an extremely light hair spring operating to impart to the balance wheel a period of oscillation about two and one-half times as long as that hitherto considered the standard of good practice. In one aspect, therefore, my invention consists in a clock movement of the type indicated in which the relation of the hair spring to the balance wheel is such as to impart one complete oscillation to the balance wheel in not less than one full second.

The period of oscillation of the balance wheel is determined primarily by two factors, (1) its moment of inertia, which will be represented herein as I, and (2) the strength of the hair spring. The moment of inertia is a function of the weight and dimensions of the balance wheel and can be regulated by design at will. The hair spring is characterized by what is called its stiffness coefficient, which will be represented by $k$, and which is the ratio of the torque required to turn the hair spring through a given angle divided by that angle, and is dependent upon the length, width and thickness, material and temper of the hair spring. This, therefore, may be similarly controlled by design. These qualities are related with the period of the balance wheel oscillation by the following equation, in which T represents the period of oscillation in seconds:

$$T = 2\pi\sqrt{\frac{I}{K}}$$

In a preferred embodiment of my invention the period of balance wheel oscillation is 1.5 seconds. Accordingly, when I employ a balance wheel whose moment of inertia is 2.13 gram centimeters squared, by the equation above explained, the stiffness coefficient of the hair spring becomes 39 dyne centimeters per radian.

I will now briefly discuss the advantages which result from the improved clock movement of the invention. In the first place, there is a considerable saving of energy in such a movement. The primary input of power is in winding the main spring. In transmitting power from the main spring to the escapement, there is a loss of energy in the gearing and this may run as high as 50 per cent in some cases when the spring is tightly wound. The loss in the gearing depends considerably upon side forces exerted on the shafts of the movement in their bearings and is thus greatest with the spring fully wound. In accordance with my invention, I am enabled to utilize a main spring much lighter in construction and much less powerful than has been considered necessary herebefore, so that the energy losses are correspondingly reduced in my improved movement.

I have found by actual measurement that the power necessary to drive the escapement mechanism of a commercial alarm clock is approximately 8 foot pounds per day, the balance wheel oscillating at an angle of about 500 degrees. This energy is, of course, finally dissipated as heat and may be lost at the fourth wheel and escape wheel bearing and gear connections, as friction of the pallets on the escape teeth, as impact loss of the escape lever in being stopped at the end of its oscillation, in friction of the pin in the throat of the lever, in pivot friction of the balance staff, and in windage losses. Some of these losses are calculable and in particular the loss due to starting and stopping the escapement lever, which comes to about 5 foot pounds per day. Obviously this loss is greater in a movement wherein the escapement lever is stopped and started more times a day. By making the period of the movement three times as long as the standard heretofore accepted practice, the lever is started and stopped one-third as often and the energy loss directly reduced in that proportion.

An important and unpredictable advantage of the clock movement of my invention is that it is self starting or, to put it in another way, so long as the main spring is wound the balance wheel cannot be stopped and will not stop in any position. This may be due to the fact that the force exerted by the hair spring is so light that it may be overcome in all positions by the effort of the main spring transmitted to the balance wheel by the escapement lever. Other factors doubtless contribute to bring about this desirable characteristic and doubtless the increased efficiency of the main spring, as well as the slower movement of the train, assist in rendering the movement self starting. For some reason which I do not fully understand at the present time, results apparently are also improved by employing an escapement mechanism of the dead beat type, as contrasted with those of the pin pallet type, for example, in which the escape wheel has to recoil to disengage its actuating pin.

Another advantage of the movement of my invention is that it will run substantially three times as long, for the same winding, as a clock movement of commercial design and may be readily designed to run for eight days, as compared with the usual run of 36 to 40 hours, in the case of commercial movements of shorter balance wheel period.

Still another advantage incident to the movement of my invention is that it is extremely quiet in running, the audible ticks being separated by a relatively long interval and being less noisy than any movements heretofore available.

Figure 2:
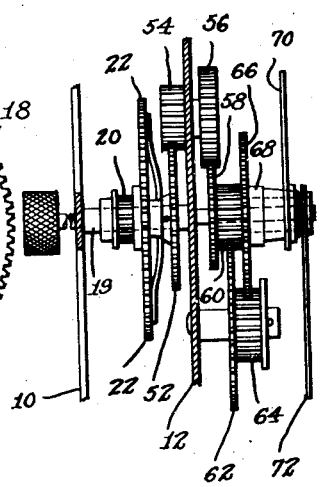
Figure 3:
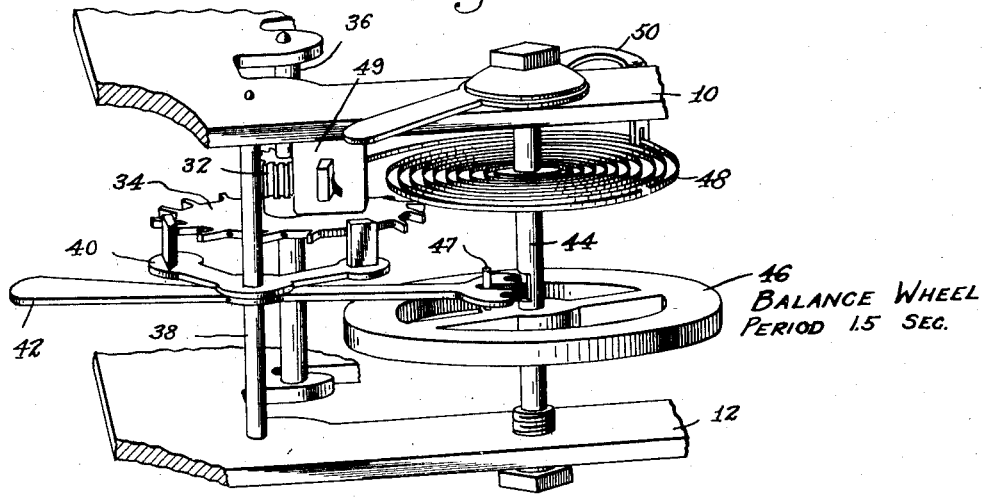

These and other features will be best understood and appreciated from the following description of a preferred embodiment thereof, selected for purposes of illustration and shown in the accompanying drawing, in which Fig. 1 is a view in rear elevation of a clock movement constructed in accordance with my invention;

Fig. 2 is a fragmentary view of the gearing in position inverted as compared to Fig. 1; and Fig. 3 is a view in perspective, on an enlarged scale, of the balance wheel and escapement mechanism.

The clock movement illustrated is assembled upon spaced plates 10 and 12 which furnish bearings for the shafts of the gearing or adjustably support such bearings. The main spring shaft 14 is surrounded by a main spring 16 of usual construction except that, as pointed out, it may be substantially less powerful than main springs heretofore used in similar clock movements and, consequently, throughout the movement the lateral pressure upon the gearing and its shafts is materially reduced and friction losses correspondingly lowered.

The main spring 16 is effective in rotating the main driving gear 18 which is journaled upon the shaft 14. The driving gear 18 meshes with a lantern pinion 20 fast on an intermediate shaft 19, which also carries a gear 22. The gear 22, operating through the gear train 24, 26, 28, 30, drives the pinion 32 fast on the shaft 36 of the escapement disk 34 and tends at all times to rotate the escapement disk in a clockwise direction, as seen in Fig. 1. An oscillating escapement lever shaft 38 is journaled in the plates 10 and 12 and carries an escapement rocker 40 having upstanding pallets which cooperate with the teeth of the escapement disk 34 and receive intermittent impulses therefrom. The design of the pallets and of the escapement teeth is such as to produce a dead beat escapement action and this characteristic of the escapement mechanism has been found to contribute to the successful running of the movement at a slow beat rate and also to its self starting characteristic.

The escapement lever shaft 38 also carries a forked escapement lever 42 which engages a pin 47 projecting upwardly from the balance wheel 46. The balance wheel 46 is fast upon an oscillating shaft 44 journaled to rock freely in bearings set adjustably in the plates 10 and 12. The balance wheel shaft 44 is connected to one end of the coiled hair spring 48, the other end of the hair spring being secured in a stationary anchor block 49 projecting downwardly from the plate 10. A forked regulating lever 50 is journaled upon the upper end of the balance wheel bearing and engages the outer turn of the hair spring.

As already explained, the salient feature of my invention consists in a novel relationship between the moment of inertia I of the balance wheel 46 and the stiffness coefficient $k$ of the hair spring 48. The balance wheel 46 herein employed is designed to have a moment of inertia of 2.13 gram centimeters squared. The hair spring 48 is of such material and dimensions as to have a stiffness coefficient of about 39 dynes. Substituting these values in the formula above referred to, we have the ratio under the radical sign .0546. The square root of this is 0.23, which gives T=1.45.

Substituting the value 1.5 in the formula, we find that the equation reduces to $k=17.4\ I$, thus determining the ratio of hair spring stiffness coefficient to balance wheel inertia which will give the desired slow beat of oscillation to the balance wheel, the latter being helped in each swing by the impulse of the escapement lever 42. It will be apparent that the actual mechanical design of the balance wheel and of the hair spring may be varied within reasonable limits so long as this ratio is maintained. Clock movements of this general type as heretofore constructed have never included a balance wheel and hair spring related in this manner and there has never been any mention that such movements as heretofore constructed were self starting. The present movement, however, presents that most useful, unexpected and unpredictable quality. So long as the main spring is wound, the balance wheel 46 will not stop in any position. Moreover, if the balance wheel is set in oscillation with a slight amplitude—one which in a rapid beat clock movement of the alarm clock type would result in immediate stopping—in the movement of my invention the amplitude is gradually increased to that of the full normal beat. I am unable to suggest a complete explanation of this phenomenon. It may be that the increased efficiency of the whole movement and the reduced tension of the hair spring enables the main spring to act through the escapement lever in all positions thereof to set the balance wheel in oscillation. As a general thing, however, when the balance wheel is forcibly stopped, either with the pin 47 on dead center or in any other angular position, the movement automatically starts itself, building up the amplitude of oscillation of the balance wheel to substantially 500° in a few oscillations.

Having reduced the rate of speed of the movement at the escapement disk 34, it is necessary to speed up the driven portion of the gearing which operates the hands of the clock. Accordingly, the shaft 19 is provided with a gear 52 which acts through the gear train 54, 56, 58, 60, 62, 64 to operate a gear 66 fast to a sleeve carrying the hour hand 70. The minute hand 72, on the other hand, is fast upon the sleeve of the gears 58—60, which is independently driven at the proper rate of speed.

Having thus described my invention, what I claim as new and desire to secure by Letters Patent is:

1. A slow beat clock movement comprising a main spring, a driven shaft, a gear train interposed therebetween, an escapement controlling said train, and a balance wheel having a light, coiled hair spring related to the balance wheel substantially in accordance with the equation $k=17\ I$.

2. A self-starting clock movement comprising a main spring, driven shaft, a gear train interposed therebetween, a dead beat escapement controlling said train, and a balance wheel having a moment of inertia of about 2.1 gram centimeters squared and a coiled hair spring with a stiffness coefficient of about 48 dyne centimeters per radian, whereby the balance wheel may be oscillated from mid-position by the effort of the main spring and the movement thus rendered automatically self-starting.

MAX KNOBEL.

CERTIFICATE OF CORRECTION.

Patent No. 2,004,814.                                                                                                June 11, 1935.

MAX KNOBEL.

It is hereby certified that error appears in the printed specification of the above numbered patent requiring correction as follows: Page 3, first column, line 5, claim 2, for "48" read 40; and that the said Letters Patent should be read with this correction therein that the same may conform to the record of the case in the Patent Office.

Signed and sealed this 16th day of July, A. D. 1935.

Leslie Frazer (Seal)                          Acting Commissioner of Patents.